US012149015B2

(12) United States Patent
Yokoyama

(10) Patent No.: US 12,149,015 B2
(45) Date of Patent: Nov. 19, 2024

(54) CONNECTOR

(71) Applicant: JAPAN AVIATION ELECTRONICS INDUSTRY, LIMITED, Tokyo (JP)

(72) Inventor: Yohei Yokoyama, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 356 days.

(21) Appl. No.: 17/866,070

(22) Filed: Jul. 15, 2022

(65) Prior Publication Data

US 2023/0046020 A1 Feb. 16, 2023

(30) Foreign Application Priority Data

Aug. 16, 2021 (JP) ................................ 2021-132179
Aug. 20, 2021 (JP) ................................ 2021-134708

(51) Int. Cl.
*H01R 12/73* (2011.01)
*H01R 12/71* (2011.01)

(52) U.S. Cl.
CPC ........... *H01R 12/73* (2013.01); *H01R 12/716* (2013.01); *H01R 12/732* (2013.01)

(58) Field of Classification Search
None
See application file for complete search history.

(56) References Cited

U.S. PATENT DOCUMENTS 10,886,667 B2 * 1/2021 Ozeki .................. H01R 12/716
11,404,809 B2 8/2022 Oosaka
11,476,601 B2 * 10/2022 Oosaka ................ H01R 12/716
11,489,291 B2 * 11/2022 Oosaka ................ H01R 12/716
(Continued)

FOREIGN PATENT DOCUMENTS

CN 110635276 12/2019
CN 212033280 11/2020
(Continued)

OTHER PUBLICATIONS

Office Action issued in Corresponding Taiwanese Patent Application No. 111125917, dated Mar. 28, 2023, along with an English translation thereof.
(Continued)

*Primary Examiner* — Ross N Gushi
(74) *Attorney, Agent, or Firm* — Greenblum & Bernstein, P.L.C.

(57) ABSTRACT

A housing having terminals held thereon is positioned within a shell in island form. The shell is formed of a single metal plate, and includes a peripheral wall surrounding the housing, bottom plates, a pair of first retaining pieces, and two pairs of second retaining pieces. The first retaining pieces respectively include raised portions to conform to side surfaces of the housing, extension portions positioned on upper surfaces of the housing, and press-fitting portions. The press-fitting portions are press-fit into holes formed in the upper surfaces. Each pair of the second retaining pieces are positioned on the opposite sides of the first retaining piece, and fitted in step portions which are at the opposite ends, in the width direction, of the side surfaces of the housing. The second retaining pieces protrude from the upper surfaces and, in the width direction, protrude from the housing.

2 Claims, 16 Drawing Sheets

(56) References Cited

U.S. PATENT DOCUMENTS

| | | | | |
|---|---|---|---|---|
| 11,527,847 | B2 * | 12/2022 | Oosaka | H01R 13/502 |
| 11,581,686 | B2 * | 2/2023 | Oosaka | H01R 13/648 |
| 11,652,323 | B2 * | 5/2023 | Oosaka | H01R 13/6585 439/607.08 |
| 11,677,176 | B2 * | 6/2023 | Oosaka | H01R 13/631 439/752.5 |
| 11,949,185 | B2 * | 4/2024 | Oosaka | H01R 13/518 |
| 2018/0175561 | A1 | 6/2018 | Chen | |
| 2021/0167555 | A1 | 6/2021 | Oosaka | |
| 2021/0359460 | A1 | 11/2021 | Oosaka | |
| 2021/0359469 | A1 | 11/2021 | Oosaka et al. | |
| 2021/0359471 | A1 | 11/2021 | Oosaka et al. | |
| 2021/0359473 | A1 | 11/2021 | Oosaka | |
| 2021/0359474 | A1 | 11/2021 | Oosaka | |
| 2022/0052470 | A1 * | 2/2022 | Hosoda | H01R 12/7005 |
| 2022/0094110 | A1 * | 3/2022 | Okubo | H01R 24/60 |
| 2022/0368046 | A1 * | 11/2022 | Oosaka | H01R 13/6585 |
| 2022/0368080 | A1 * | 11/2022 | Oosaka | H01R 13/6582 |
| 2023/0046774 | A1 * | 2/2023 | Yokoyama | H01R 12/712 |
| 2023/0110507 | A1 * | 4/2023 | Ebisawa | H01R 13/6582 439/607.04 |
| 2023/0246359 | A1 * | 8/2023 | Suzuki | H01R 13/6582 439/74 |
| 2023/0291153 | A1 * | 9/2023 | Ebisawa | H01R 12/714 |
| 2023/0411911 | A1 * | 12/2023 | Kim | H01R 12/716 |
| 2024/0097382 | A1 * | 3/2024 | Shimomura | H01R 13/6594 |
| 2024/0145998 | A1 * | 5/2024 | Kim | H01R 12/73 |

FOREIGN PATENT DOCUMENTS

| | | |
|---|---|---|
| JP | 2021-089829 A | 6/2021 |
| KR | 10-2016-0076733 | 7/2016 |
| KR | 10-2020-0008840 | 1/2020 |
| KR | 10-2020-0135199 | 12/2020 |
| TW | 201824651 | 7/2018 |

OTHER PUBLICATIONS

U.S. Appl. No. 17/865,474 to Yohei Yokoyama, which was filed on Jul. 15, 2022.

Office Action Issued in Corresponding KR Patent Application No. 10-2022-0085625, dated Mar. 18, 2024, along With an English translation thereof.

* cited by examiner

CONNECTOR

TECHNICAL FIELD

The present invention relates to a connector that is used by being mounted on a board as a board-to-board connector, for example.

BACKGROUND ART

Japanese Patent Application Laid Open No. 2021-89829 (hereinafter referred to as Patent Literature 1) describes a board-to-board connector. FIG. 1 shows a first connector 10 as a component of the board-to-board connector described in Patent Literature 1, and FIG. 2 shows a second connector 20 as a component of the board-to-board connector.

The first connector 10 is formed of a first insulator 11, multiple first contacts 12 arrayed and held on the first insulator 11, and a conductive first shell 13. FIG. 3A shows the first shell 13 and FIG. 3B shows a state in which the first shell 13 has been removed from the first connector 10.

The first insulator 11 has a bottom plate portion 11*a* and a pair of side walls 11*b*. A central protruding portion 11*c* is formed on an upper surface of the bottom plate portion 11*a* so as to protrude, and lateral protruding portions 11*d* are further formed on the opposite sides across the central protruding portion 11*c* so as to protrude. Recessed portions 11*e*, 11*f* are formed on the opposing side surfaces of the central protruding portion 11*c* and the lateral protruding portions 11*d*, respectively, and each first contact 12 straddles these recessed portions 11*e* and 11*f* and fixedly held on the first insulator 11.

The first shell 13 in the form of a square frame is formed by folding of a metal plate, having outer wall portions 14 positioned on the opposing two sides as the longer sides of the square, respectively, and outer wall portions 15 positioned on the other opposing two sides as the shorter sides of the square, respectively. The first shell 13 further has a pair of inner wall portions 16 and a pair of inner wall portions 17 which are folded back inward from the outer wall portions 14, 15, respectively, and positioned inside the outer wall portions 14, 15, respectively. The neighboring outer wall portions 14 and 15 are coupled at an upper end by a coupling portion 18. Projections 17*a* are formed at the ends of the inner wall portions 17 in a side direction so as to protrude, and an arm portion 19 is formed in an extending manner in a central portion of a lower end of each inner wall portion 17.

Attachment of the first shell 13 is done by placing the first shell 13 over the first insulator 11 having the first contacts 12 held thereon and pushing in the first shell 13, press-fitting the inner wall portions 17 having the projections 17*a* into recessed portions 11*g* in the inner surfaces of the side walls 11*b* of the first insulator 11, and press-fitting tip portions 19*a* of the arm portions 19 into holes 11*i* in step portions 11*h*, which are at the opposite ends of the central protruding portion 11*c*.

The second connector 20 is formed of a second insulator 21, multiple second contacts 22 arrayed and held on the second insulator 21, and a conductive second shell 23. The second insulator 21 has a pair of retaining walls 21*a*. The second contacts 22 are insert-molded on the second insulator 21 and arrayed and held on the respective retaining walls 21*a*.

The second shell 23 in the form of a square frame is formed by folding of a metal plate, having outer wall portions 24 positioned on the opposing two sides as the longer sides of the square, respectively, outer wall portions 25 positioned on the opposing two sides as the shorter sides of the square, respectively, and coupling portions 26 coupling upper ends of the outer wall portions 24 and 25. Attachment of the second shell 23 is done by placing the second shell 23 over the second insulator 21 having the second contacts 22 held thereon and pushing in the second shell 23, as with the first shell 13 of the first connector 10.

The first connector 10 and the second connector 20 are mounted on the opposing surfaces of boards which are placed opposite each other, and connected with each other. FIG. 4 shows the first connector 10 and the second connector 20 in a connected state, where the boards are not illustrated. The second connector 20 is fitted into the first shell 13 of the first connector 10 in the form of a square frame and connected with the first connector 10.

For such connectors mounted on boards as board-to-board connectors, measures against EMI are an increasingly important issue with more compact electronic devices being used, higher packaging density, and higher frequencies of electrical signals.

With the conventional board-to-board connector consisting of the first connector 10 and the second connector 20 described above, the first connector 10 and the second connector 20 have their respective first shell 13 and second shell 23 which are conductive such that the first shell 13 and the second shell 23 each provide electromagnetic shielding; however, both the first shell 13 and the second shell 23 defining the outer enclosures of the first connector 10 and the second connector 20 are of a shape with portions of the outer walls missing at the corners of the square and electromagnetic leakage occurs from these missing portions of the outer walls. Thus, their shielding effect cannot be said to be sufficient.

BRIEF SUMMARY OF THE INVENTION

In view of this issue, an object of the present invention is to provide a connector having good shielding performance, and further a connector that prevents damage in fitting and detachment of a mating connector.

Technical matters described herein are not intended to explicitly or implicitly limit the invention as recited in the claims and further are not a statement of possibility of permitting such a limitation by persons other than those who benefit from this invention (for example, the applicant and a right holder), but are described merely for facilitating understanding the gist of the present invention. Overview of the present invention from other aspects can be understood from the claims as of the filing of the present application, for example.

The conductive shell of the connector has an enclosing wall (also called a "peripheral wall" below) in the form of a frame without a seam. The enclosing wall surrounds four sides of the insulating housing that holds terminals therein. This conductive shell further has four armor portions (also called "second retaining pieces" below) that are positioned at four corners of the insulating housing and protect the four corners of the insulating housing against contact with the mating connector.

Effects of the Invention

The present invention can provide a connector that has good shielding performance and can prevent damage in fitting and detachment of a mating connector.

LIST OF REFERENCE NUMERALS

Figure 1:
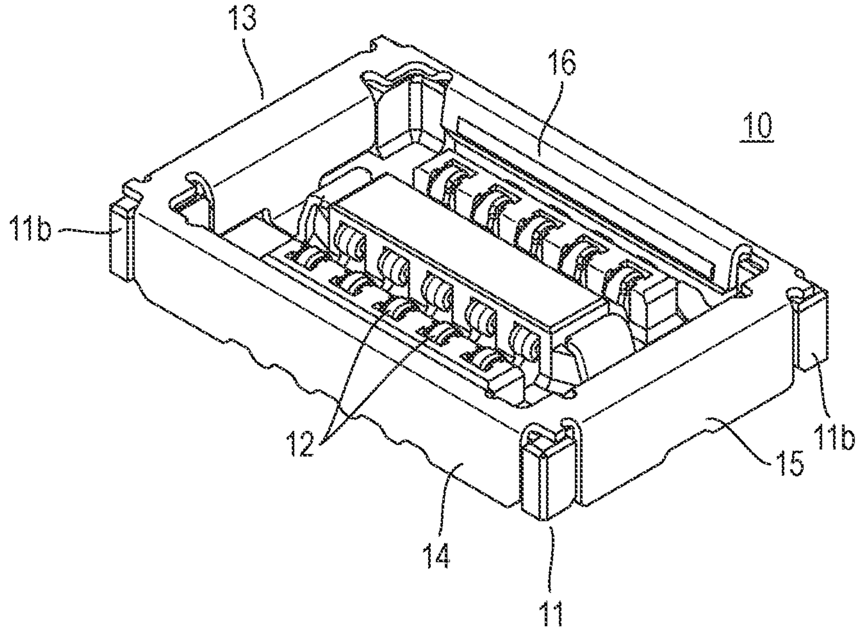
FIG. 1 (PRIOR ART)
FIG. 1 is a perspective view showing a first connector for a conventional board-to-board connector.
Figure 2:
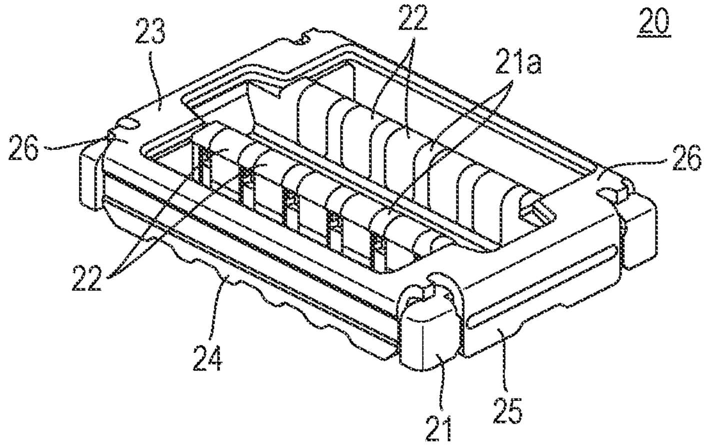
FIG. 2 (PRIOR ART)
FIG. 2 is a perspective view showing a second connector for the conventional board-to-board connector.
Figure 3A:
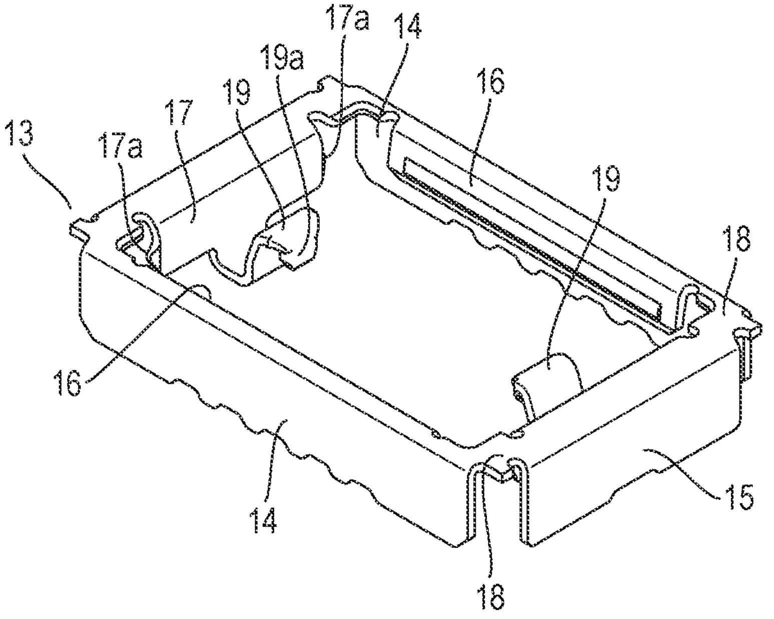
FIG. 3A (PRIOR ART)
FIG. 3A is a perspective view showing a first shell in FIG. 1.
Figure 3B:
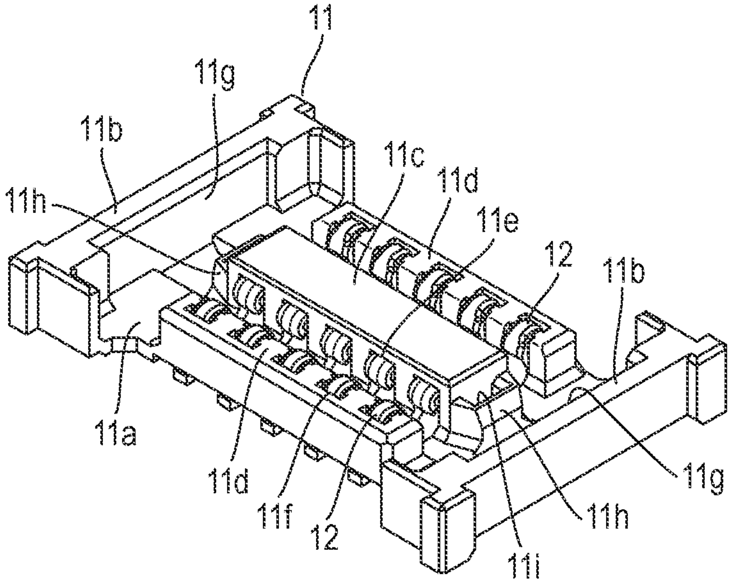
FIG. 3B (PRIOR ART)
FIG. 3B is a perspective view showing a first insulator having first contacts held thereon from FIG. 1.
Figure 4:
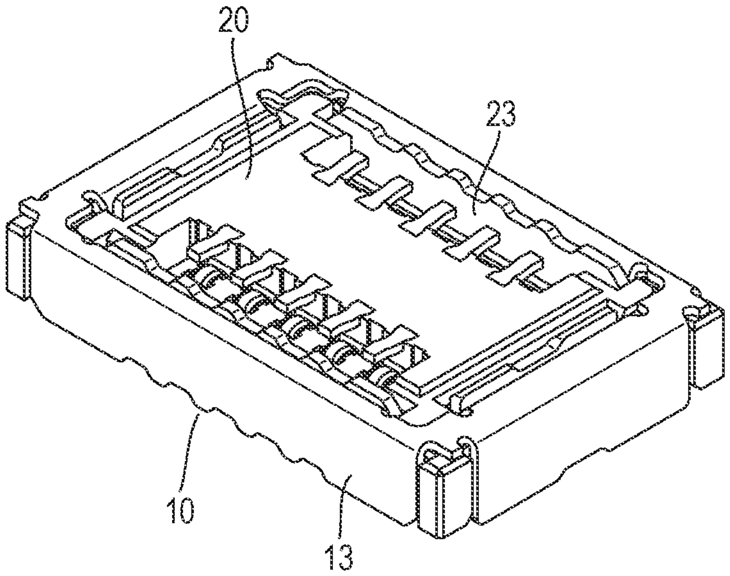
FIG. 4 (PRIOR ART)
FIG. 4 is a perspective view showing the first connector shown in FIG. 1 and the second connector shown in FIG. 2 in a connected state.

10: first connector
11: first insulator
11*a*: bottom plate portion
11*b*: side wall
11*c*: central protruding portion
11*d*: lateral protruding portion
11*e*: recessed portion
11*f*: recessed portion
11*g*: recessed portion
11*h*: step portion
11*i*: hole
12: first contact
13: first shell
14: outer wall portion
15: outer wall portion
16: inner wall portion
17: inner wall portion
17*a*: projection
18: coupling portion
19: arm portion
19*a*: tip portion
20: second connector
21: second insulator
21*a*: retaining wall

22: second contact
23: second shell
24: outer wall portion
25: outer wall portion
26: coupling portion
30: housing
30*a*: upper surface
30*b*: side surface
30*c*: side surface
30*e*: side surface
30*f*: side surface
30*d*: lower surface
31: groove
32: recessed portion
33: recessed portion
34: hole
35: step portion
36: central protruding portion
37: recessed portion
40: terminal
41: connecting portion
50: shell
51: peripheral wall
51*a*: bent portion
51*b*: lug
51*c*: lug
52: bottom plate
52*a*: notch
53: first retaining piece
53*a*: raised portion
53*b*: extension portion
53*c*: press-fitting portion
54: second retaining piece
54*a*: projection
60: housing
70: terminal
80: shell
81: outer wall portion
82: outer wall portion
81*a*: lug
82*a*: extension portion
83: coupling portion
84: inner wall portion
100: connector
200: mating connector

DETAILED DESCRIPTION

An embodiment is described with reference to drawings.

Figure 5A:
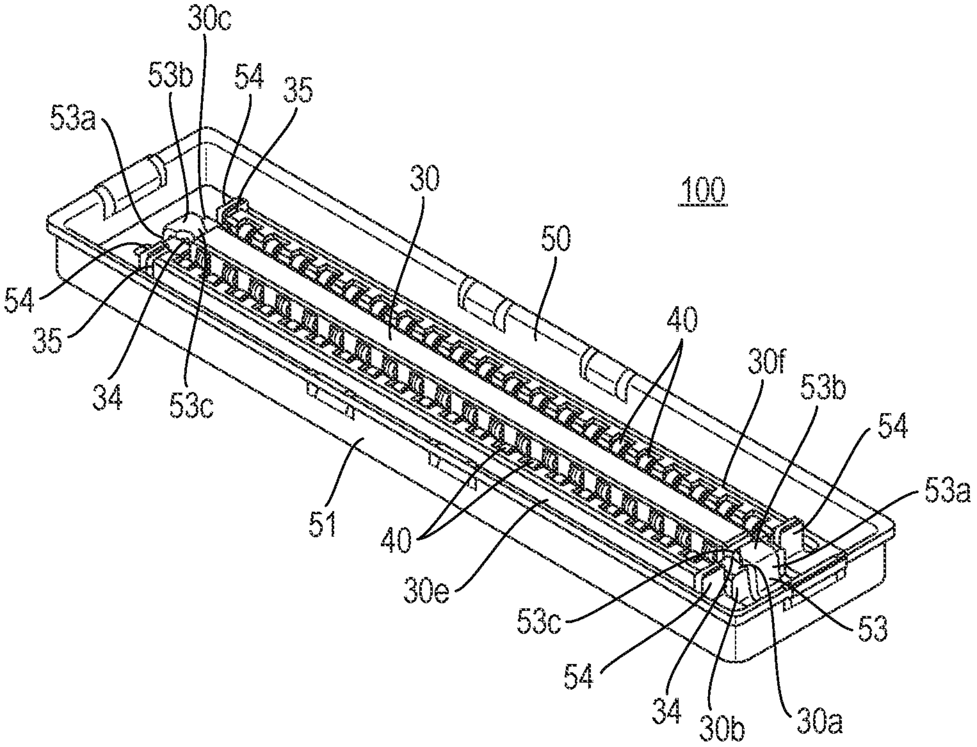
FIG. 5A is a perspective view of a connector according to an embodiment as seen from above.
Figure 5B:
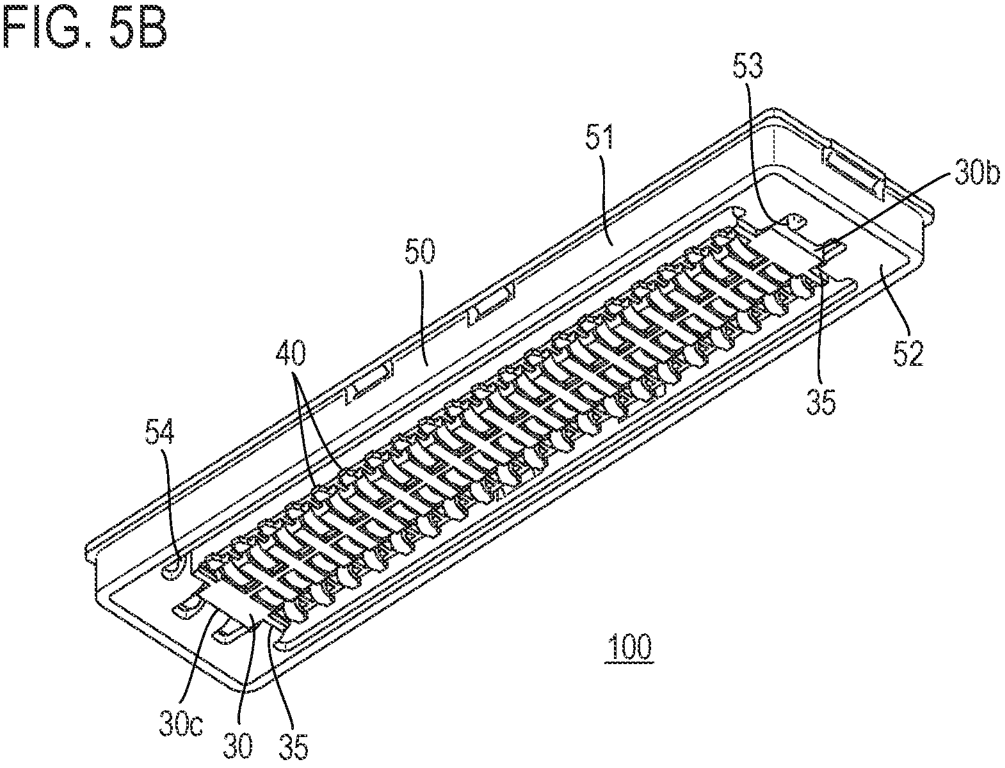
FIG. 5B is a perspective view of the connector shown in FIG. 5A as seen from below.

FIGS. 5A and 5B show an embodiment of a connector of the present invention, where a connector 100 is a connector for mounting on one board as a board-to-board connector, for example, and is a connector on the side to which the mating connector is fitted (a connector for receiving the mating connector), corresponding to the aforementioned first connector 10 shown in FIG. 1.

Figure 6A:
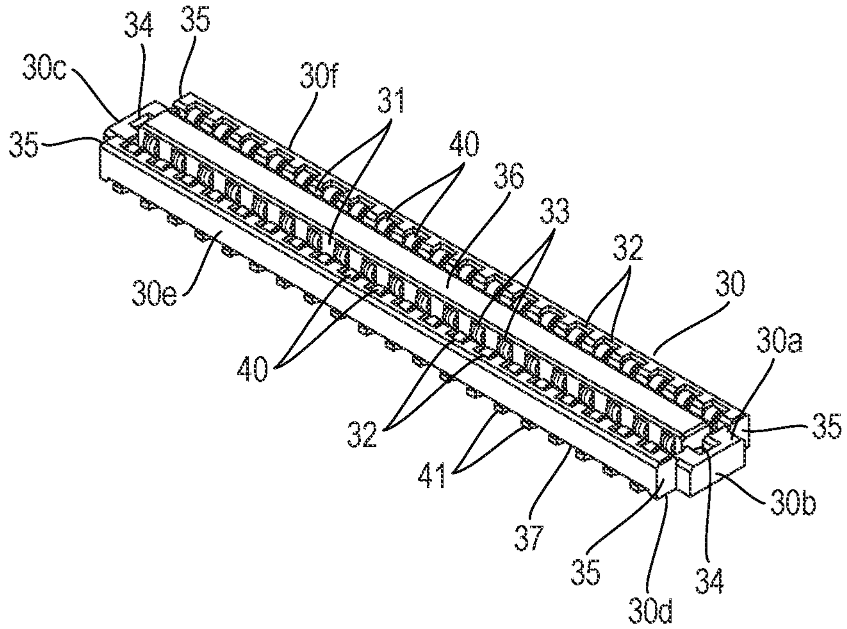
FIG. 6A is a perspective view of a housing shown in FIG. 5A having terminals held thereon as seen from above.
Figure 6B:
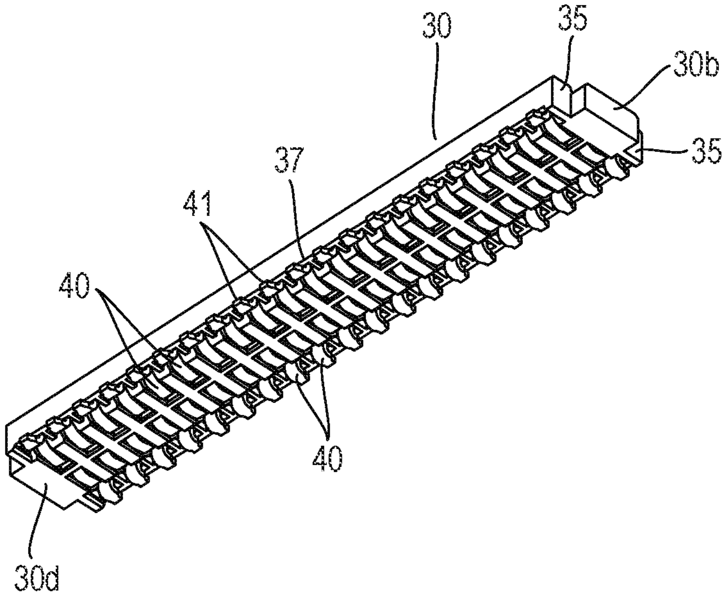
FIG. 6B is a perspective view of the housing shown in FIG. 6A having terminals held thereon as seen from below.
Figure 7A:
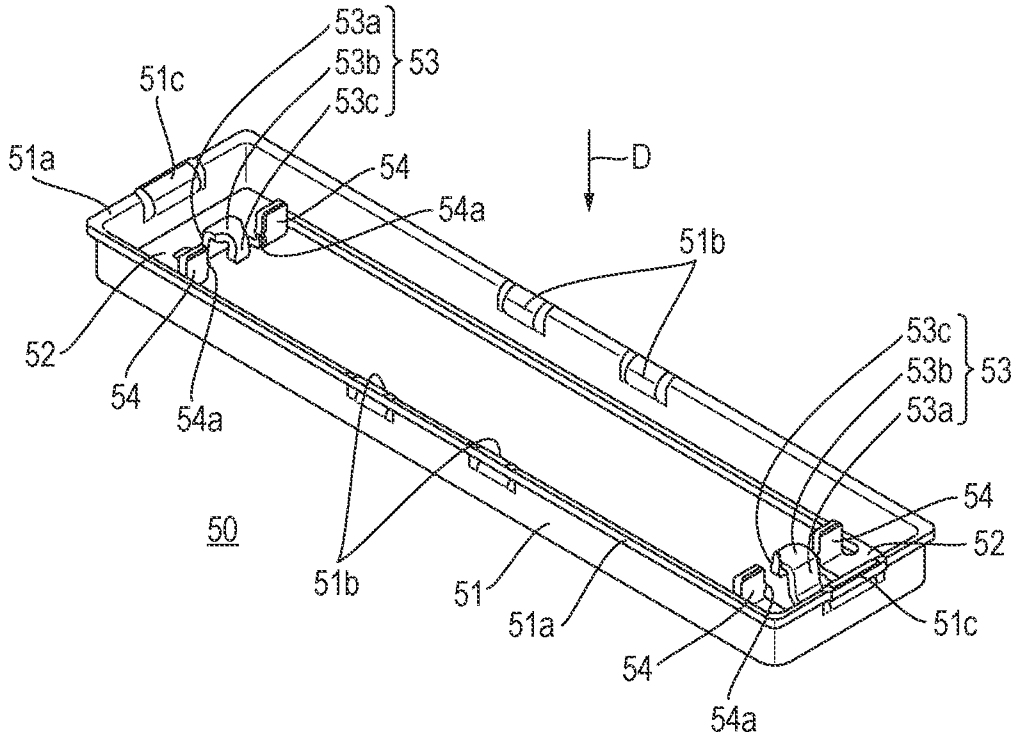
FIG. 7A is a perspective view of a shell shown in FIG. 5A as seen from above.
Figure 7B:
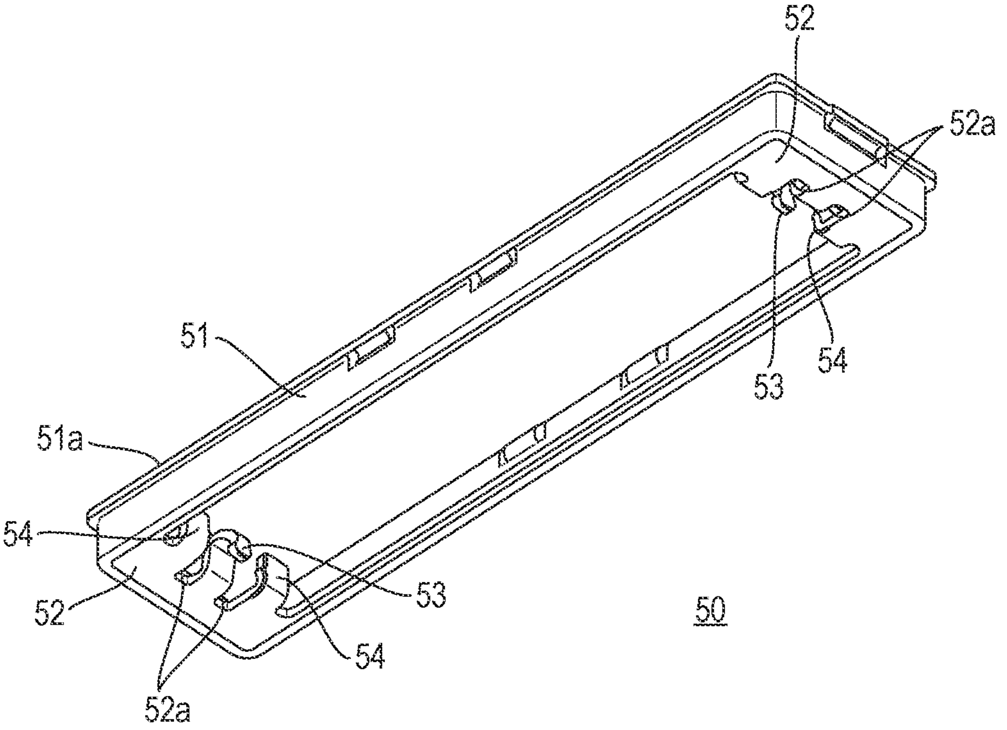
FIG. 7B is a perspective view of the shell shown in FIG. 7A as seen from below.

The connector 100 is formed of an insulating housing 30, multiple (forty in this example) terminals 40 arrayed and held on the housing 30, and a conductive shell 50. FIGS. 6A and 6B show a state in which the shell 50 has been removed from the connector 100, and FIGS. 7A and 7B show details of the shell 50.

The housing 30 is made of resin and in this example is in the shape of an elongated, flat substantially rectangular parallelepiped. The housing 30 has two elongated grooves 31 formed in parallel to each other and extending in a longitudinal direction except for longitudinal ends. In the longitudinal inner walls of these grooves 31 that are opposite each other, recessed portions 32, 33 are formed, respectively, being arrayed in the longitudinal direction at a predetermined pitch, where twenty pairs of the recessed portions 32, 33 formed opposite each other are present in each of the grooves 31. At the longitudinal ends of the housing 30, holes 34 positioned in the center of a width direction of the housing 30 are formed respectively in upper surfaces 30*a* of the housing 30 on the side to which the mating connector is to be fitted. Step portions 35 recessed from the side surfaces 30*b*, 30*c* are formed respectively in the opposite ends, in the width direction, of the side surface 30*b*, 30*c* at the longitudinal ends of the housing 30. A portion of the housing 30 that sits between the two grooves 31 is made slightly higher than the upper surfaces 30*a*, forming a central protruding portion 36.

The terminals 40 have been inserted from a lower surface 30*d* of the housing 30 and attached to the housing 30. Each terminal 40 straddles the recessed portions 32 and 33, where twenty terminals 40 are arranged in each groove 31 of the housing 30. A connecting portion 41 of each terminal 40 to be soldered to a pad on the board is positioned in a recessed portion 37 formed in the lower surface 30*d* of the housing 30, with the tips of the terminals 40 slightly protruding from side surfaces 30*e*, 30*f* of the housing 30, respectively.

The shell 50 is formed by processing of a single metal plate, having a peripheral wall 51 in the form of a rectangular frame, bottom plates 52 formed extending from lower ends of the peripheral wall 51 on the side of mounting to the board (opposite to the side to which the mating connector is fitted) to inside of the peripheral wall 51, and a pair of first retaining pieces 53 and two pairs of second retaining pieces 54 formed extending from the bottom plates 52.

The bottom plates 52 are positioned at longitudinal ends of the shell 50 and slightly block an opening formed by the peripheral wall 51. The pair of first retaining pieces 53 are formed by being raised so as to face each other from the bottom plates 52, which are positioned at the longitudinal ends of the shell 50. Each first retaining piece 53 is formed of a raised portion 53*a*, an extension portion 53*b* extending being folded from the raised portion 53*a* inwardly with respect to the opposite extension portion 53*b*, and a press-fitting portion 53*c* extending being folded downward from the extension portion 53*b*.

Each pair of the two pairs of second retaining pieces 54 are positioned on the opposite sides of one first retaining piece 53 and are raised from the bottom plate 52 in a similar manner to the raised portions 53*a* of the first retaining pieces 53. A projection 54*a* is formed on an end surface of each second retaining piece 54 on the side facing the first retaining piece 53 so as to protrude. Each bottom plate 52 is provided with notches 52*a* positioned between the first retaining piece 53 and the second retaining pieces 54.

The peripheral wall 51 is of a single-ply structure of a metal plate which is continuous without a seam throughout the periphery, and a bent portion 51*a* formed by being bent outward is provided at an upper end throughout the periphery. Two lugs 51*b* protruding inward are formed respectively on the upper end side of the opposing two sides of the peripheral wall 51 representing the longer sides of the rectangle, while one lug 51*c* which also protrudes inward is formed respectively on the upper end side of the other opposing two sides representing the shorter sides of the rectangle.

The shell 50 structured as described above is formed by drawing a blank (flat plate) cut into a required shape and then performing bending of the first retaining pieces 53 and the second retaining pieces 54 and processing for making lugs 51*b*, 51*c* stick out. In FIG. 7A, arrow D indicates the direction of drawing. The bottom plate 52 defines the bottom in the drawing process.

Attachment of the shell 50 to the housing 30 is done by pushing down the shell 50 from above the housing 30 having the terminals 40 held thereon, press-fitting the press-fitting portions 53*c* of the pair of the first retaining pieces 53 into the holes 34 of the housing 30, and fitting the two pairs of the second retaining pieces 54 having the projections 54*a* into the step portions 35 of the housing 30, respectively. The housing 30 is held by the pair of the first retaining pieces 53 and the two pairs of the second retaining pieces 54 and positioned within the shell 50 in island form, creating a structure in which its entire periphery is surrounded by the peripheral wall 51 of the shell 50, thus completing the connector 100 shown in FIGS. 5A and 5B. The raised portions 53*a* of the pair of the first retaining pieces 53 are positioned so as to respectively conform to the side surfaces 30*b*, 30*c* of the housing 30 (side surfaces of the housing 30 that are opposite each other), making a structure of sandwiching the housing 30, while the extension portions 53*b* are positioned on the upper surfaces 30*a* of the housing 30. Upper ends of the second retaining pieces 54 fitted in the step portions 35, which are positioned at the opposite ends, in the width direction, of the side surfaces 30*b*, 30*c* of the housing 30 across the portion to which the raised portion 53*a* of the first retaining piece 53 conforms, protrude from the upper surfaces 30*a* of the housing 30. The side end on the side opposite to the side where the projection 54*a* is formed protrudes from the housing 30 in the width direction of the side surfaces 30*b*, 30*c*, that is, protrudes from the side surfaces 30*e*, 30*f* of the housing 30 along the longitudinal direction.

Figure 8A:
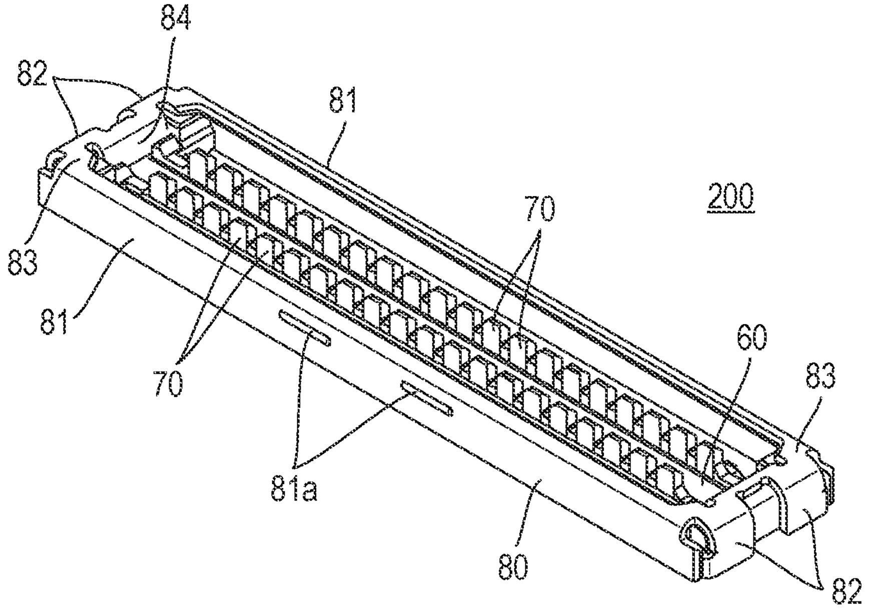
FIG. 8A is a perspective view of a mating connector to be fitted with the connector shown in FIG. 5A as seen from above.
Figure 8B:
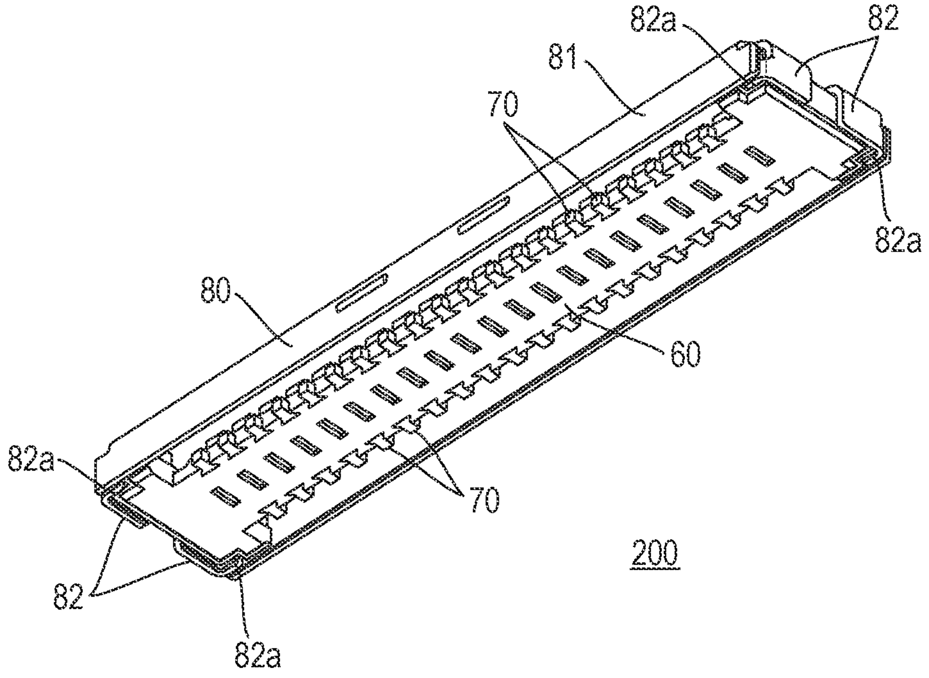
FIG. 8B is a perspective view of the mating connector shown in FIG. 8A as seen from below.

FIGS. 8A and 8B show a mating connector 200 which is fitted with the connector 100 described above to constitute a board-to-board connector. In FIGS. 8A and 8B, reference numeral 60 indicates an insulating housing and 70 indicates a terminal. Reference numeral 80 indicates a conductive shell. The terminals 70 are insert-molded on the housing 60 and arranged in two rows, where there are twenty terminals per row, or forty terminals in total in the two rows.

The shell 80 in the form of a rectangular frame is formed by folding of a metal plate in this example, and has outer wall portions 81 positioned on the opposing two sides as the longer sides of the rectangle, respectively, outer wall portions 82 positioned on the opposing two sides as the shorter sides of the rectangle, respectively, coupling portions 83 coupling upper ends of the outer wall portions 81 and 82, and inner wall portions 84 folded inward from the respective outer wall portions 82 and positioned inside the outer wall portions 82. Each outer wall portion 82 is split into two due to lack of a center of the side direction, and has extension portions 82*a* which extend being folded from the opposite ends of the side direction, and are positioned inside the outer wall portions 81 and overlap the outer wall portions 81.

Attachment of the shell 80 to the housing 60 is done by placing the shell 80 over the housing 60 having the terminals 70 held thereon and pushing in the shell 80. Two lugs 81*a* protruding outward are formed on each of the two outer wall portions 81 of the shell 80.

Figure 9:
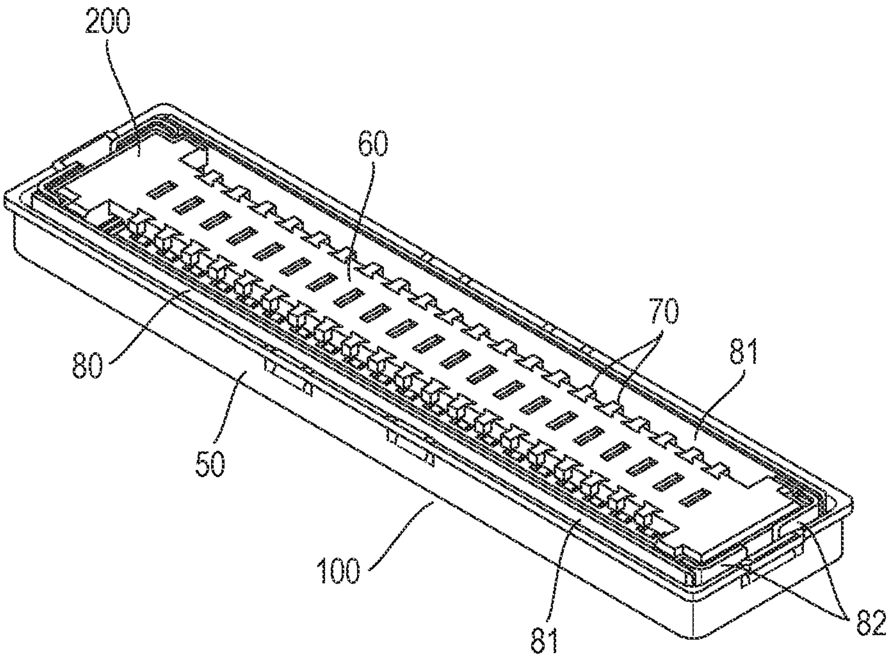
FIG. 9 is a perspective view showing the connector shown in FIGS. 5A and 5B and the mating connector shown in FIGS. 8A and 8B in a fitted state.

FIG. 9 shows the connector 100 and the mating connector 200 in a fitted state, where the boards on which the connector 100 and the mating connector 200 are mounted respectively are not illustrated. The mating connector 200 is structured to be fitted into the shell 50 of the connector 100 and connected with the connector 100.

While the structure of the connector 100 as an embodiment of the connector according to the present invention has been described and further the structure of the mating connector 200 and the state of fitting with the mating connector 200 have been described, the structure of the connector 100 can provide the effects (1) to (3):

(1) Since the peripheral wall 51 of the shell 50 defining the outer enclosure of the connector 100 and responsible for electromagnetic shielding is structured such that a metal plate runs continuously throughout the periphery and there is no seam throughout the periphery, electromagnetic leakage or the like does not occur as in the conventional first connector 10 and hence good shielding performance can be obtained.

In addition, as the connector 100 is a connector into which the mating connector 200 is fitted and which receives the mating connector 200, the mating connector 200 is also enclosed by the peripheral wall 51 of the shell 50 when the mating connector 200 is fitted. Accordingly, sufficient shielding performance can be achieved in a fitted state even if the shielding performance of the mating connector 200 is not sufficient, for example.

(2) The raised portions 53*a* of the pair of the first retaining pieces 53 conform to the side surfaces 30*b*, 30*c* of the housing 30 respectively and are positioned so as to sandwich the housing 30. The extension portions 53*b* are positioned on the upper surfaces 30*a* of the housing 30. The two pairs of the second retaining pieces 54 are structured such that their upper ends protrude from the upper surfaces 30*a* of the housing 30 and their side ends protrude from the side surfaces 30*e*, 30*f* of the housing 30. These arrangements enable avoidance of damage to the housing 30 that could be caused by hitting of the metallic shell 80 of the mating connector 200 against the housing 30 made of resin, even when the mating connector 200 is misaligned with the connector 100 in fitting of the mating connector 200 or a tilt such that the connector 100 is prized is occurring with the mating connector 200.

Figure 10A:
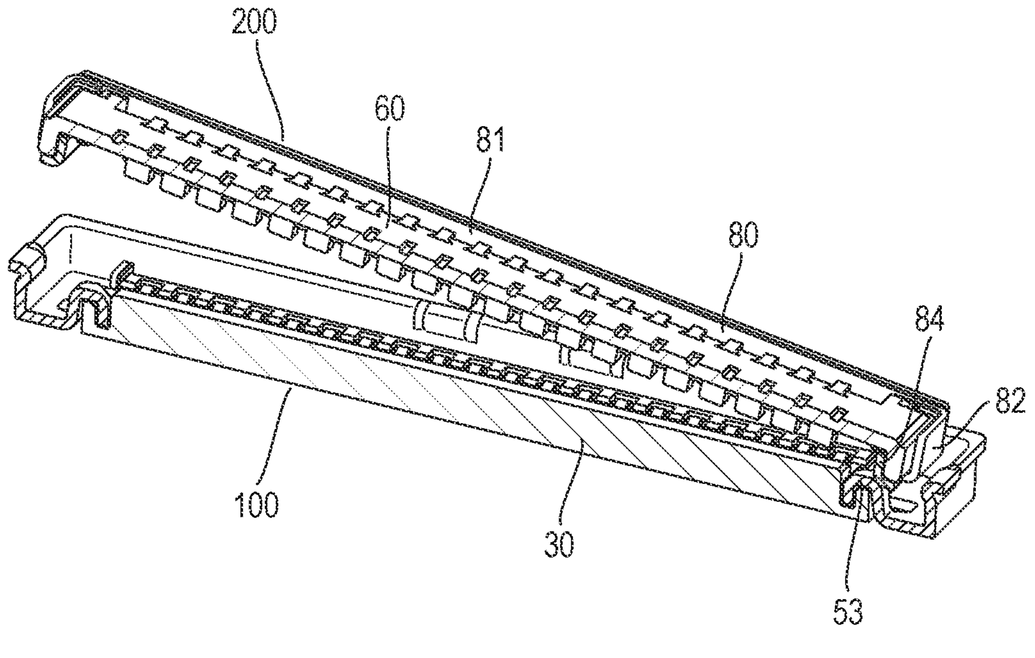
FIG. 10A is a cross-sectional view showing a circumstance during fitting of the connector shown in FIGS. 5A and 5B the mating connector shown in FIGS. 8A and 8B.
Figure 10B:
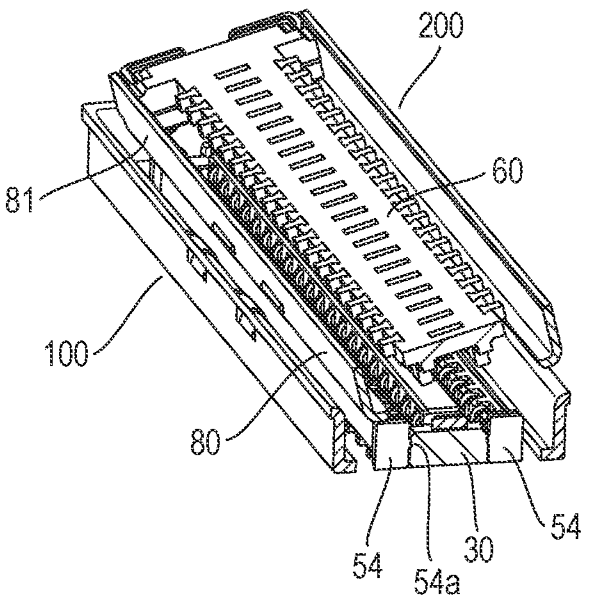
FIG. 10B is a cross-sectional view showing another circumstance during fitting of the connector shown in FIGS. 5A and 5B and the mating connector shown in FIGS. 8A and 8B.

FIGS. 10A and 10B show such situations, where FIG. 10A shows a circumstance where the mating connector 200 is fitted while being misaligned in the longitudinal direction of the housing 30 and tilted in the longitudinal direction, and FIG. 10B shows a circumstance where the mating connector 200 is fitted while being misaligned in the width direction of the housing 30 and tilted in the width direction. In FIG. 10A, the shell 80 of the mating connector 200 hits against the first retaining piece 53, thus preventing damage to the housing 30, while in FIG. 10B, the shell 80 of the mating connector 200 hits against the second retaining piece 54, thus preventing damage to the housing 30. In this way, the pair of the first retaining pieces 53 and the two pairs of the second retaining pieces 54 have functions of holding the housing 30 and also preventing damage to the housing 30.

(3) The peripheral wall 51 of the shell 50 is formed of a single-ply metal plate unlike the conventional first connector 10 where two layers of metal plates are present inside and outside. Also, the housing 30 is not present in the portion where the peripheral wall 51 is positioned but the peripheral wall 51 is present alone, and the housing 30 is configured to be positioned within the shell 50 in island form. These aspects facilitate downsizing of the connector.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connector configured to be fitted with a mating connector, the connector comprising an insulating housing, terminals arrayed and held on the housing, and a conductive shell, wherein the housing is positioned within the shell in island form, the shell is formed of a single metal plate, and includes a peripheral wall surrounding the housing, bottom plates extending from lower ends of the peripheral wall on a side opposite to a side to which the mating connector is fitted to inside of the peripheral wall, and a pair of first retaining pieces and two pairs of second retaining pieces extending from the bottom plates, the peripheral wall is of a single-ply structure of the metal plate without a seam throughout a periphery thereof, the pair of the first retaining pieces respectively includes raised portions that are raised from the bottom plates so as to respectively conform to side surfaces of the housing that are opposite each other, extension portions extending and being folded from the raised portions and being positioned on upper surfaces of the housing on the side to which the mating connector is fitted, and press-fitting portions extending and being folded from the extension portions, and the press-fitting portions are press-fit into holes formed in the upper surfaces, respectively, step portions recessed from the side surfaces are formed respectively in opposite ends, in a width direction, of each of the side surfaces of the housing across a portion to which each of the raised portion conforms, each pair of the two pairs of the second retaining pieces are positioned on the opposite sides of the first retaining piece, are raised from each of the bottom plates, and fitted in the step portions, respectively, and the second retaining pieces protrude from the upper surfaces and, in the width direction, protrude from the housing.

2. The connector according to claim 1, wherein a bent portion formed by being bent outward is provided at an upper end of the peripheral wall throughout the periphery.

* * * * *